(12) United States Patent
Striemer

(10) Patent No.: US 6,931,463 B2
(45) Date of Patent: Aug. 16, 2005

(54) PORTABLE COMPANION DEVICE ONLY FUNCTIONING WHEN A WIRELESS LINK ESTABLISHED BETWEEN THE COMPANION DEVICE AND AN ELECTRONIC DEVICE AND PROVIDING PROCESSED DATA TO THE ELECTRONIC DEVICE

(75) Inventor: Bryan Lester Striemer, Zumbrota, MN (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 09/951,852

(22) Filed: Sep. 11, 2001

(65) Prior Publication Data

US 2003/0051083 A1 Mar. 13, 2003

(51) Int. Cl.[7] .............................................. G06F 13/00
(52) U.S. Cl. ............................ 710/62; 710/65; 710/72; 709/203
(58) Field of Search ............................... 710/15, 62–65, 710/72; 709/203, 217–219, 227, 2; 455/414; 704/246, 251, 260

(56) References Cited

U.S. PATENT DOCUMENTS

| 5,444,768 | A | | 8/1995 | Lemaire et al. ................ 379/68 |
| 5,956,681 | A | * | 9/1999 | Yamakita ..................... 704/260 |
| 6,069,896 | A | * | 5/2000 | Borgstahl et al. ............ 370/401 |
| 6,532,446 | B1 | * | 3/2003 | King ........................ 704/270.1 |
| 6,535,243 | B1 | * | 3/2003 | Tullis ........................ 348/207.1 |
| 6,633,759 | B1 | * | 10/2003 | Kobayashi .................. 455/419 |
| 2001/0049277 | A1 | * | 12/2001 | Meyer et al. ................ 455/414 |
| 2001/0052858 | A1 | * | 12/2001 | Vincent et al. ......... 340/825.69 |
| 2002/0002575 | A1 | * | 1/2002 | Eisler et al. .................... 709/1 |
| 2002/0077060 | A1 | * | 6/2002 | Lehikoinen et al. ........... 455/41 |
| 2003/0069921 | A1 | * | 4/2003 | Lamming et al. ........... 709/203 |

FOREIGN PATENT DOCUMENTS

| GB | 2 346 766 A | 8/2000 |
| GB | 2 346 767 A | 8/2000 |
| GB | 2 348 083 A | 9/2000 |

OTHER PUBLICATIONS

"Specification of the Bluetooth System, Core, Version 1.0.B, Service Discovery Protocol (SDP)," Nov. 29, 1999, XP002176975.

"Specification of the Bluetooth System, Profiles, Version 1.0.B, Service Discovery Application Profile," Dec. 1, 1999, XP002176976.

* cited by examiner

*Primary Examiner*—Ilwoo Park
(74) *Attorney, Agent, or Firm*—Martin & Associates, LLC; Derek P. Martin

(57) ABSTRACT

A companion device provides non-native function to a different electronic device. In the preferred embodiments, the electronic device and the companion device both include a local wireless interface that allows communicating between the two, such as a Bluetooth interface. When the electronic device comes within range of the companion device, it detects the presence of the companion device, and thus knows what enhanced function the companion device provides. In a first embodiment, the electronic device transmits information to the companion device, which processes the information and transmits the processed information to the electronic device. In a second embodiment, the companion device receives information from a source other than the electronic device, processes the information, and transmits the information to the electronic device. In both embodiments, the companion device provides non-native functions to the electronic device. Examples of non-native functions include text-to-voice conversion, voice-to-text conversion, processing of audio files, processing of video files, performing complex mathematical computations, and digital signal processing.

38 Claims, 12 Drawing Sheets

PORTABLE COMPANION DEVICE ONLY FUNCTIONING WHEN A WIRELESS LINK ESTABLISHED BETWEEN THE COMPANION DEVICE AND AN ELECTRONIC DEVICE AND PROVIDING PROCESSED DATA TO THE ELECTRONIC DEVICE

BACKGROUND OF THE INVENTION

1. Technical Field

This invention generally relates to electronic devices, and more specifically relates to a wireless companion device and method for extending the capabilities of an electronic device.

2. Background Art

Modern electronic devices have emerged that provide great power in a small, portable package. Mobile phones have become very popular, and have become a necessity for many people. Small hand-held computers known as Personal Digital Assistants (PDAs) have also become very popular, allowing users to store a great deal of information and to run certain software applications. Recent PDAs include slots for expansion cards and extra ports that allow a user to extend the function of the PDA, if needed. Some PDAs even have a mobile phone interface, allowing a user to use the PDA as a mobile phone as well as a hand-held computer. In addition, mobile phone manufacturers are placing an increasing number of features in their phones in an attempt to compete with PDAs. Many mobile phones can now receive and send e-mail. In short, both PDA manufacturers and mobile phone manufacturers are beginning to compete with each other as each tries to extend its device into the other's domain.

Several problems exist with known ways to add functionality to a mobile phone or to a PDA. Adding slots for expansion cards increases the size and power requirements of the unit. Building enhanced functions into each unit increases the price of the unit and potentially provides many expensive functions that many users may not need. Providing additional circuitry for enhanced functions shortens battery life. The need for enhanced function competes directly with the need for a portable device that is small, lightweight, affordable, and has long battery life. Manufacturers currently must trade off size, weight, cost, and battery life with function. Without a way to extend the function of an electronic device without suffering the current trade-offs of adding that function, the electronics industry will continue to suffer from a selection of products that trade off performance for other physical features of the device.

DISCLOSURE OF INVENTION

According to the preferred embodiments, a companion device provides non-native function to a different electronic device. In the preferred embodiments, the electronic device and the companion device both include a local wireless interface that allows communicating between the two, such as a Bluetooth interface. When the electronic device comes within range of the companion device, it detects the presence of the companion device, and thus knows what enhanced function the companion device provides. In a first embodiment, the electronic device transmits information to the companion device, which processes the information and transmits the processed information to the electronic device. In a second embodiment, the companion device receives information from a source other than the electronic device, processes the information, and transmits the information to the electronic device. In both embodiments, the companion device provides non-native functions to the electronic device. Examples of non-native functions include text-to-voice conversion, voice-to-text conversion, processing of audio files, processing of video files, performing complex mathematical computations, and digital signal processing.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Overview

The preferred embodiments relate to providing enhanced functions for a portable electronic device. To understand the context of the invention, a discussion of the prior art is provided below.

Figure 1:
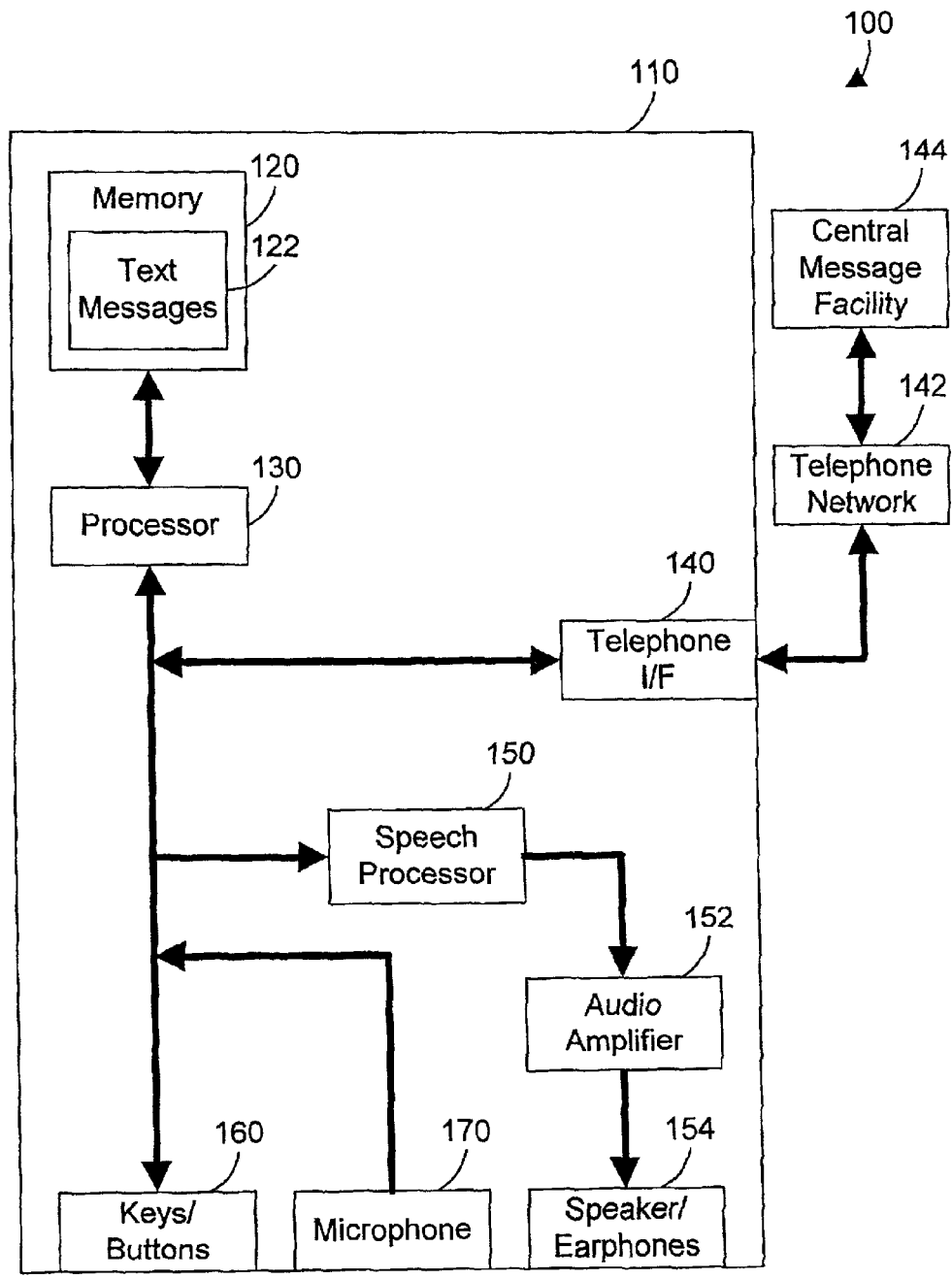
FIG. 1 is a block diagram of a prior art system for receiving text messages from a central message facility and for converting the text messages to a speech audio output.

The inventor of this invention is also a co-inventor of the invention disclosed in U.S. Pat. No. 5,444,768 "Portable Computer Device for Audible Processing of Remotely Stored Messages." FIG. 1 herein is a block diagram that is representative of many of the features shown in FIG. 2 of the '768 patent. Referring now to FIG. 1, a system 100 includes a portable computer device 110 that has a memory 120 coupled to a processor 130. Processor 130 is coupled to a telephone interface 140, a speech processor 150, keys and buttons 160, and a microphone 170. Telephone interface 140 is coupled to a telephone network 142, which is coupled to a central message facility 144. Speech processor 150 is coupled to an audio amplifier 152, which is coupled to a speaker or earphones 154. When the telephone interface 140 is connected to a standard telephone line (that is part of telephone network 142), the portable computer device 110 dials the central message facility 144 and requests text messages, which are downloaded from the central message facility 144 via the telephone network 142 and telephone interface 140, and which are stored in memory 120 as text messages 122. At the user's command (by pressing appropriate keys or buttons 160), a text message 122 is retrieved from memory 120 and written to speech processor 150, which converts the text message 122 into an audio stream of synthesized speech that corresponds to the text message 122. The audio stream is output to an audio amplifier 152, which drives a speaker or earphones 154. In this manner, the device in the '768 patent allows text messages to be downloaded from the central message facility, and to be converted to audio messages so the user can listen to these messages instead of reading the messages on a display. Note that the invention in the '768 patent also includes a tape mechanism and other functions (such as the ability to respond to a text message with a voice message) that are not discussed herein.

Figure 2:
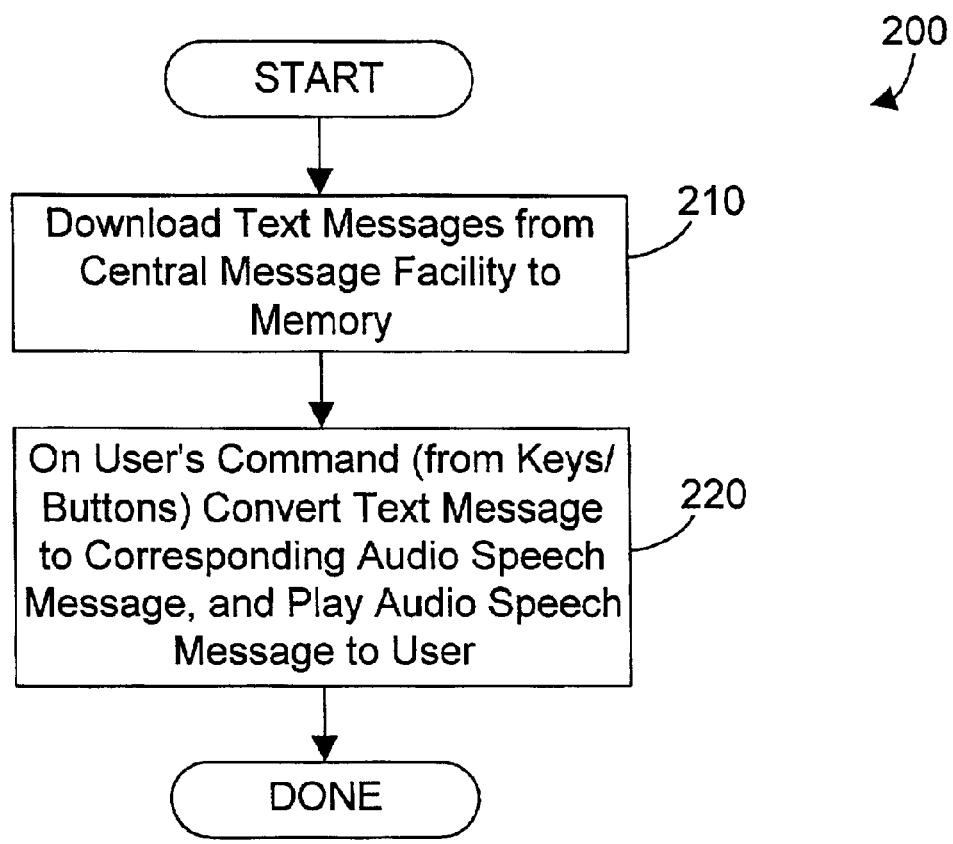
FIG. 2 is a flow diagram of a method for downloading and processing the text messages in FIG. 1.

Referring to FIG. 2, a method 200 shows the steps of processing text messages in accordance with the teachings of the '768 patent. First, one or more text messages are downloaded from the central message facility to the memory 120 (step 210). Next, on the user's command (from keys/buttons 160), a text message 122 is converted to a corresponding audio speech message, which is played to the user (step 220). In this manner, method 200 allows a user to listen to his text messages instead of reading them. This is of obvious beneficial use to the visually-impaired, allowing them to convert text messages (such as e-mail) to an audio message. In addition, this allows those who prefer to listen to text messages the capability to do so.

Figure 3:
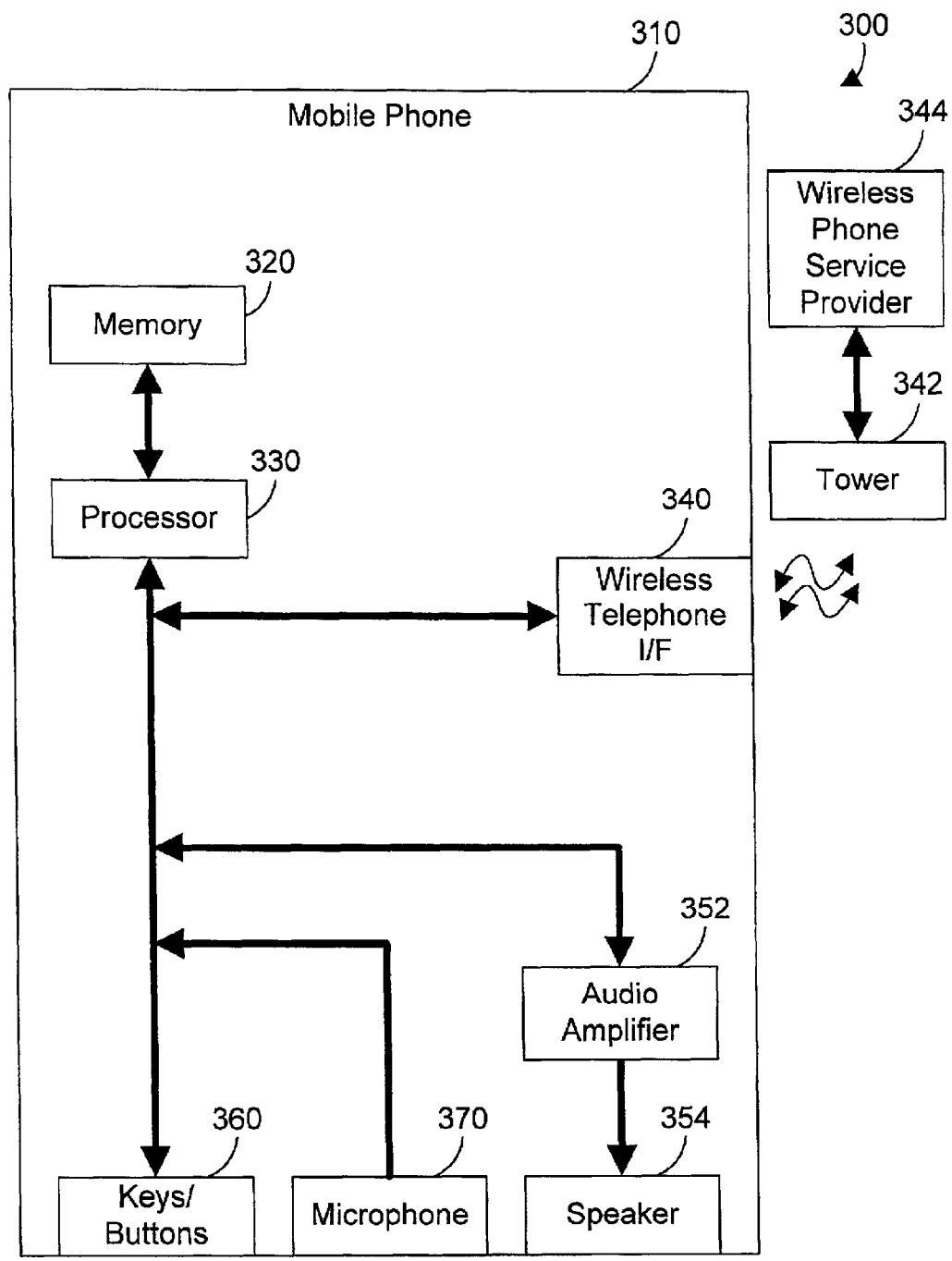
FIG. 3 is a block diagram of a prior art mobile phone.

FIG. 3 is a block diagram that shows some of the features in a prior art mobile phone system 300. A mobile phone 310 includes a wireless telephone interface 340 that sends information to and receives information from a local tower 342, which is coupled to the wireless phone service provider 344. Mobile phone 310 typically includes a memory 320 coupled to a processor 330, which is also coupled to keys/buttons 360 that allow a user to dial a phone number, scroll through menus, etc.; to microphone 370 in the mouthpiece of the mobile phone 310; and to an audio amplifier 352 that amplifies audio information and outputs the amplified audio information to speaker 354 in the earpiece of the mobile phone 310. Many known mobile phones also include various other components and functions not discussed herein.

Detailed Description

The preferred embodiments provide a wireless companion device that provides functionality that is not native to an electronic device. When the electronic device and companion device come within range of each other, the electronic device may use the companion device to perform some type of processing or other service that is not available within the electronic device itself. In this manner a small, portable companion device may be used to provide needed function without having to build the function into the electronic device itself.

Figure 4:
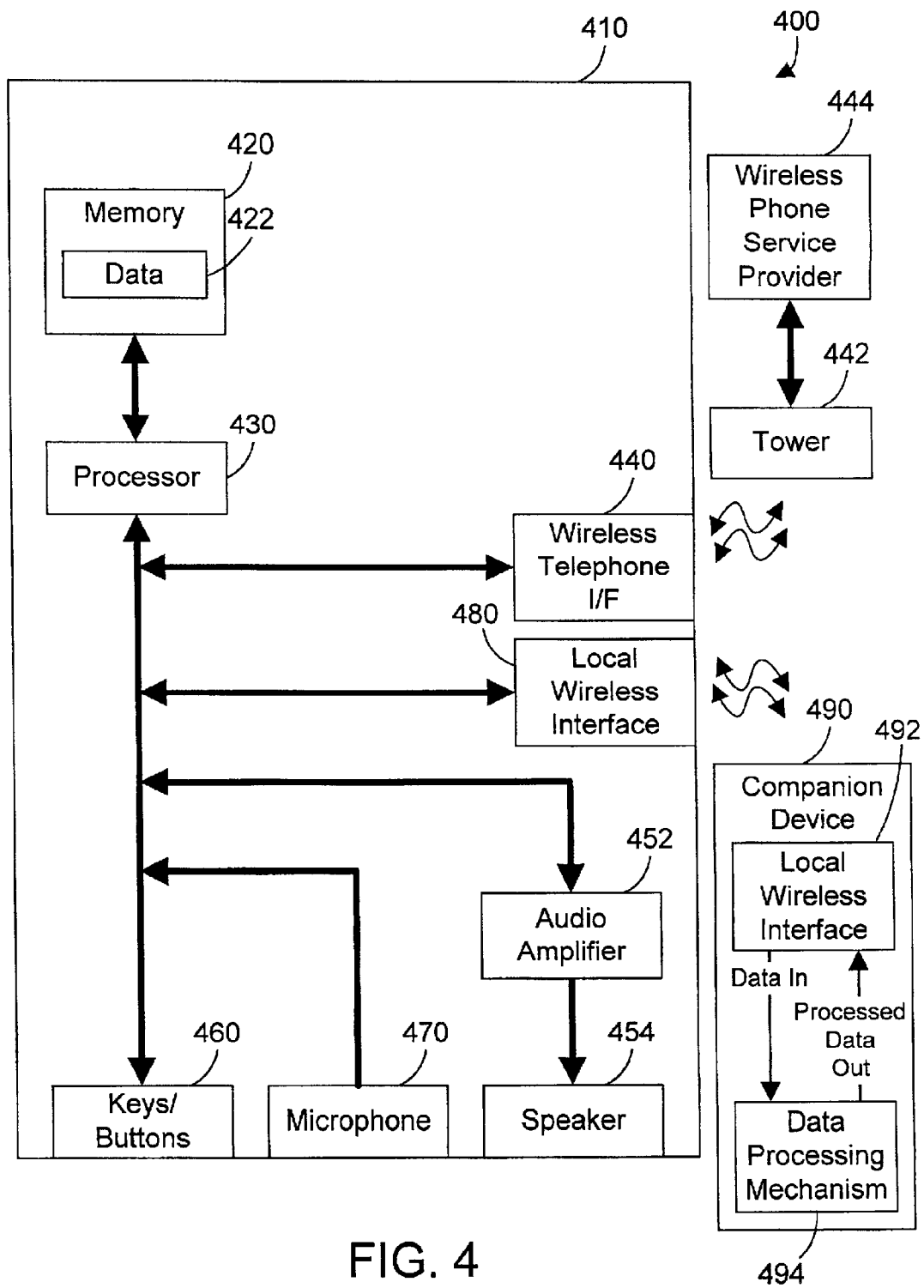
FIG. 4 is a block diagram of a system that includes a companion device that provides non-native function to an electronic device according to the preferred embodiments.

Referring to FIG. 4, a system 400 in accordance with the preferred embodiments includes an electronic device 410. In the preferred embodiment shown in FIG. 4, electronic device 410 is a mobile phone or PDA that includes a wireless telephone interface 440 that communicates with a tower 442 via wireless transmission and reception. Tower 442 is coupled to a wireless phone service provider 444, as is known in the art.

Electronic device 410 includes a memory 420 coupled to a processor 430, which is also coupled to the wireless telephone interface 440, a local wireless interface 480, an audio amplifier 452, keys/buttons 460, and a microphone 470. Audio amplifier 452 is coupled to a speaker 454 in device 410, such as the earpiece of a mobile phone.

Local wireless interface 480 is an interface that is used for short-range communication between different electronic devices. Local wireless interface 480 couples the device 410 to a local wireless interface 492 in a companion device 490. The companion device 490 includes a data processing mechanism 494 that preferably provides function that is not provided within the electronic device 410. Data 422 stored in memory 420 may be transmitted via the local wireless interface 480 to the local wireless interface 492 in the companion device 490. This data (Data In) may be sent to the data processing mechanism 494, which generates processed data out that is sent to the local wireless interface 492, which in turn sends the processed data via the local wireless interface 480 to the electronic device 410. In this manner companion device 490 provides processing capabilities that are not native to the hardware and programming of electronic device 410. Several examples are provided herein to illustrate different types of functions that could be provided by a companion device within the scope of the preferred embodiments.

Figure 5:
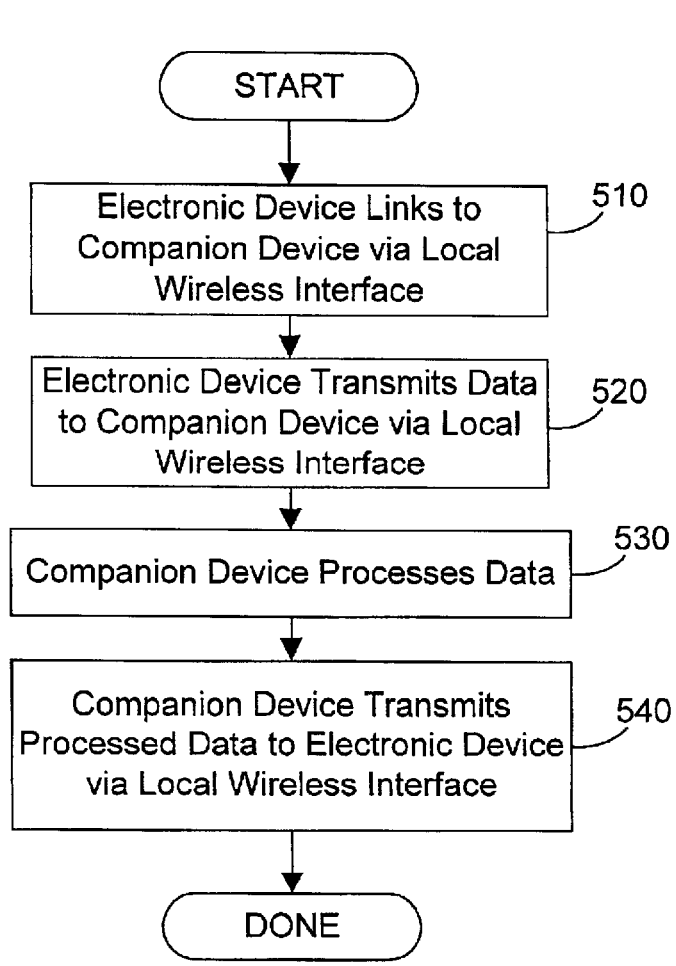
FIG. 5 is a flow diagram of a method for a companion device to provide non-native functions to an electronic device in accordance with the preferred embodiments.

Referring to FIG. 5, a method 500 in accordance with the preferred embodiments begins by the electronic device linking to the companion device via the local wireless interface (step 510). Once the link is established, the electronic device transmits data to the companion device via the local wireless interface (step 520). The companion device then processes the data (step 530). The companion device then sends the processed data to the electronic device via its local wireless interface (step 540). In this manner method 500 allows an electronic device to use a companion device to provide a data processing function (i.e., non-native function) that is not otherwise available within the electronic device itself.

Figure 6:
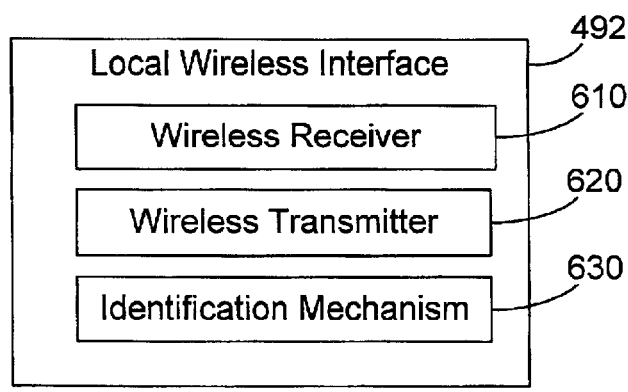
FIG. 6 is a block diagram of one implementation of the local wireless interface 492 of FIG. 4.

FIG. 6 shows a block diagram of one suitable implementation of a local wireless interface 492 shown in FIG. 4. Local wireless interface 492 preferably includes a wireless receiver 610 for receiving data, a wireless transmitter 620 for sending data, and an identification mechanism 630 that identifies the function of the companion device to an electronic device that succeeds in linking its own local wireless interface with the local wireless interface 492 in the companion device. Identification mechanism 630 may include any suitable identification information, including the function provided by the companion device, a serial number or other unique identifier for the companion device, authentication and authorization information (such as a login name and password required to establish a link), etc. While the local wireless interface 492 may include many different types of interfaces, the preferred implementation of the local wireless interface 492 is a Bluetooth interface.

Many manufacturers of electronic devices are planning to integrate a local wireless interface known as Bluetooth that allows an electronic device to automatically connect to other devices that have a Bluetooth interface within a short range. One goal of Bluetooth is to interconnect many electronic devices without using hard-wire cables. For example, a computer network that includes four computer systems, four monitors, a printer, and a scanner could theoretically be all interconnected via Bluetooth without using any cables to interconnect these items.

Bluetooth includes the capability of identifying each type of device as it establishes a link to other devices. Thus, a printer that has a Bluetooth interface will identify itself as a printer, which makes the print function available to other devices that are linked via Bluetooth to the printer. A mobile phone that includes a Bluetooth interface could automatically detect when it comes in range of a printer that has a Bluetooth interface, and in response to detecting the printer the mobile phone could provide an option to print e-mail or other text information received by the mobile phone, which would send the e-mail or other information to the printer. Details regarding Bluetooth and it's detailed specification may be found at www.bluetooth.com.

Referring again to FIG. 4, the preferred embodiments use Bluetooth as the preferred local wireless interface 480 and 492 for communicating between the electronic device 410 and the companion device 490. Bluetooth includes mechanisms that automatically establish the link between devices, and that automatically identify a device to another device once the link has been established.

In a first embodiment of the invention, data within the electronic device 410 is transmitted to the companion device 490, which processes the data and transmits the processed data to the electronic device 410. Some examples of different types of data processing within the scope of the first embodiment are shown in FIGS. 7–18. Note that FIGS. 7–18 specifically refer to the Bluetooth interface, because this is the preferred implementation, but any short range local wireless interface could be used to communicate between the electronic device 410 and a companion device 490.

Figure 7:
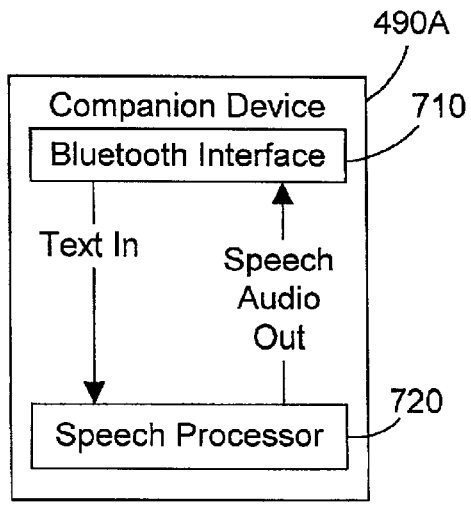
FIG. 7 is a block diagram of a companion device that converts text messages to speech audio in accordance with the first embodiment.

One specific example of a companion device within the scope of the first embodiment is companion device 490A shown in FIG. 7. Companion device 490A provides a speech processor 720 that can convert text information to a speech audio output stream. In other words, companion device 490A performs a text-to-speech conversion. When the electronic device 410 links via its Bluetooth interface to companion device 490A, it can send text data to the companion device 490A via its Bluetooth interface 710. Speech processor 720 processes the text input, and generates a synthesized speech audio output, which is transmitted to the electronic device 410 via the Bluetooth interface 710.

Figure 8:
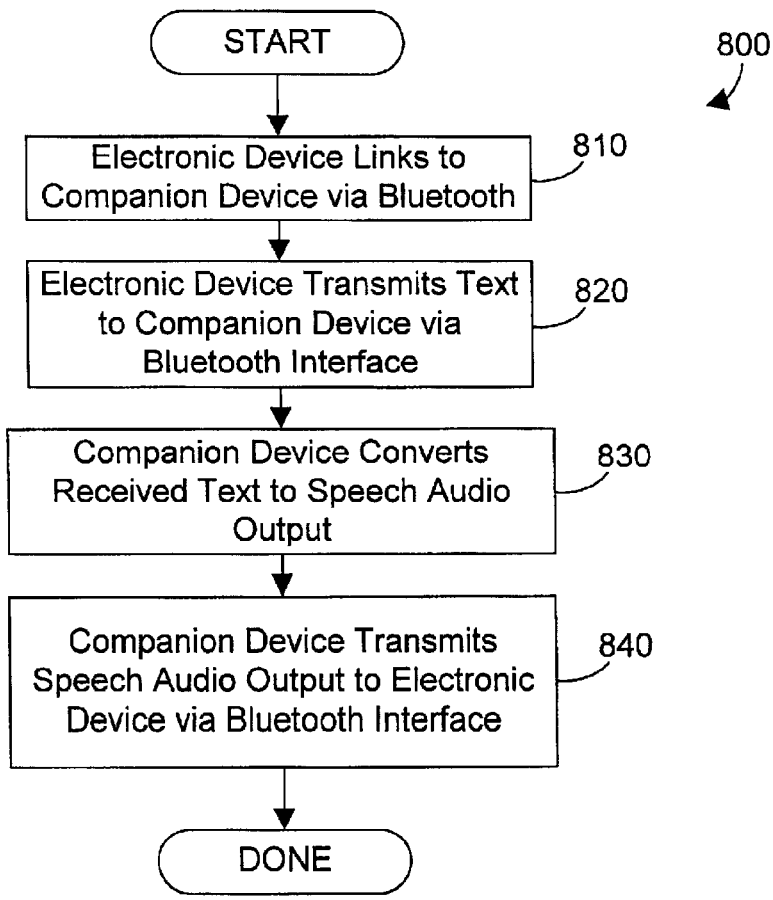
FIG. 8 is a flow diagram of a method for using the companion device in FIG. 7 in accordance with the first embodiment.

Method 800 of FIG. 8 includes steps in accordance with the first embodiment for processing text and generating therefrom a speech audio message. First, the electronic device links to the companion device via Bluetooth (step 810). Next, the electronic device transmits text information to the companion device via the Bluetooth interface (step 820). The companion device converts the received text to speech audio output (step 830), which is then transmitted to the electronic device via the Bluetooth interface (step 840). In this manner the companion device 490A provides a text-to-speech conversion function that is not part of the native functions of the electronic device 410. Such a text-to-speech conversion capability would allow a user to listen to any suitable text information, including e-mail messages, word processor documents, web page text, news articles, magazine articles, books, etc. Note that electronic device 410 may receive such text information from any suitable source, including a source coupled to the wireless telephone interface 440, a source coupled to the local wireless interface 480, or a source coupled via any other means to electronic device 410.

Figure 9:
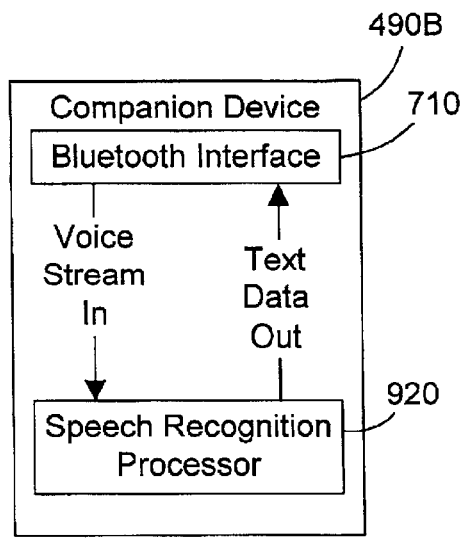
FIG. 9 is a block diagram of a companion device that converts a voice stream to text data in accordance with the first embodiment.

Another specific example of a companion device within the scope of the first embodiment is companion device 490B shown in FIG. 9. Companion device 490B provides a speech recognition processor 920 that can process an audio voice stream and generate therefrom corresponding text information. In other words, companion device 490B performs a speech-to-text conversion. When the electronic device 410 links via its Bluetooth interface to companion device 490B, it can send a voice audio stream to the companion device 490B via the Bluetooth interface 710. Speech recognition processor 920 processes the received voice audio stream, and generates therefrom corresponding text data, which is transmitted to the electronic device 410 via the Bluetooth interface 710.

Figure 10:
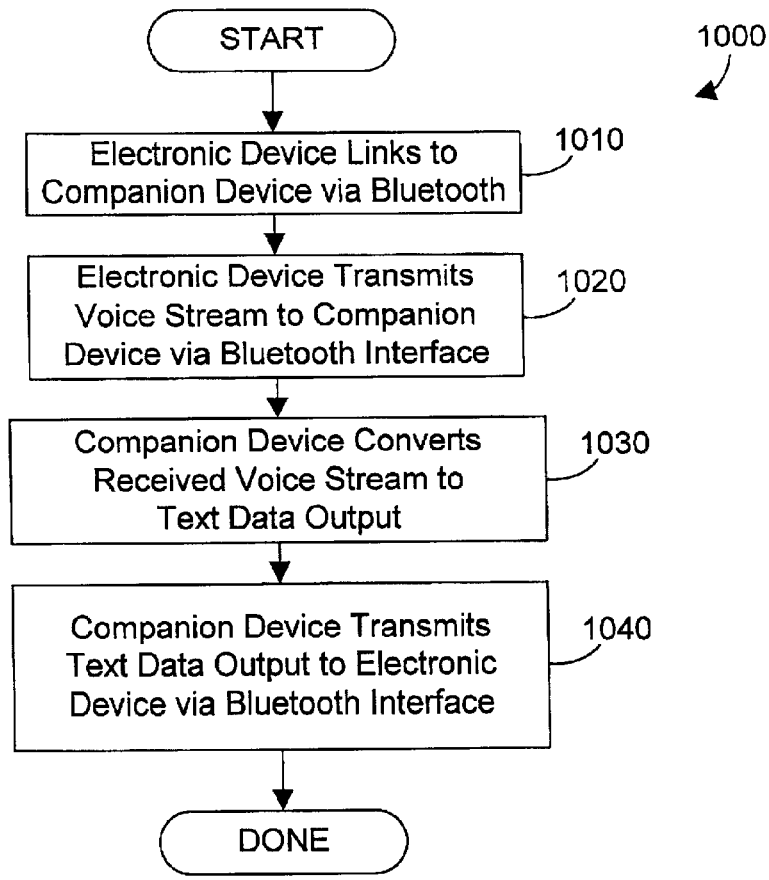
FIG. 10 is a flow diagram of a method for using the companion device in FIG. 9 in accordance with the first embodiment.

Method 1000 of FIG. 10 includes steps in accordance with the first embodiment for processing a voice audio stream and generating therefrom corresponding text. First, the electronic device links to the companion device via Bluetooth (step 1010). Next, the electronic device transmits the voice audio stream to the companion device via the Bluetooth interface (step 1020). The companion device converts the voice audio stream to corresponding text (step 1030), which is then transmitted to the electronic device via the Bluetooth interface (step 1040). In this manner the companion device 490B provides a speech-to-text conversion function that is not part of the native functions of the electronic device 410. Such a speech-to-text conversion capability would allow a user to speak into microphone 470 of the electronic device and turn that speech into a text message, or to convert any stored audio information into corresponding text. One application allows a user to verbally respond to an e-mail message, which verbal response can be converted to text and sent in response to the e-mail message. Another application allows a user to convert a stored audio stream, such as a speech from a famous person, to a corresponding text output. Note that electronic device 410 may receive a voice stream from any suitable source, including a source coupled to the wireless telephone interface 440, a source coupled to the local wireless interface 480, from the microphone 470, or from a source coupled via any other means to electronic device 410.

Figure 11:
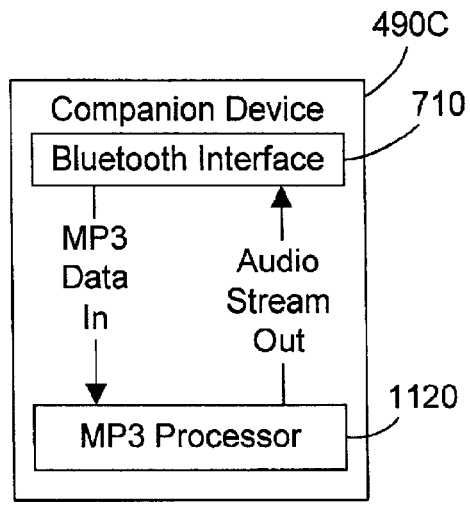
FIG. 11 is a block diagram of a companion device that processes MP3 files and generates therefrom a corresponding audio stream in accordance with the first embodiment.

Another specific example of a companion device within the scope of the first embodiment is companion device 490C shown in FIG. 11. Companion device 490C provides an MP3 processor 1120 that processes MP3 audio files and generates therefrom an audio stream output. When the electronic device 410 links via its Bluetooth interface to companion device 490C, it can send an MP3 file to the companion device 490C via the Bluetooth interface 710. MP3 processor 1120 processes the received MP3 data, and generates therefrom a corresponding audio stream output, which is transmitted to the electronic device 410 via the Bluetooth interface 710.

Figure 12:
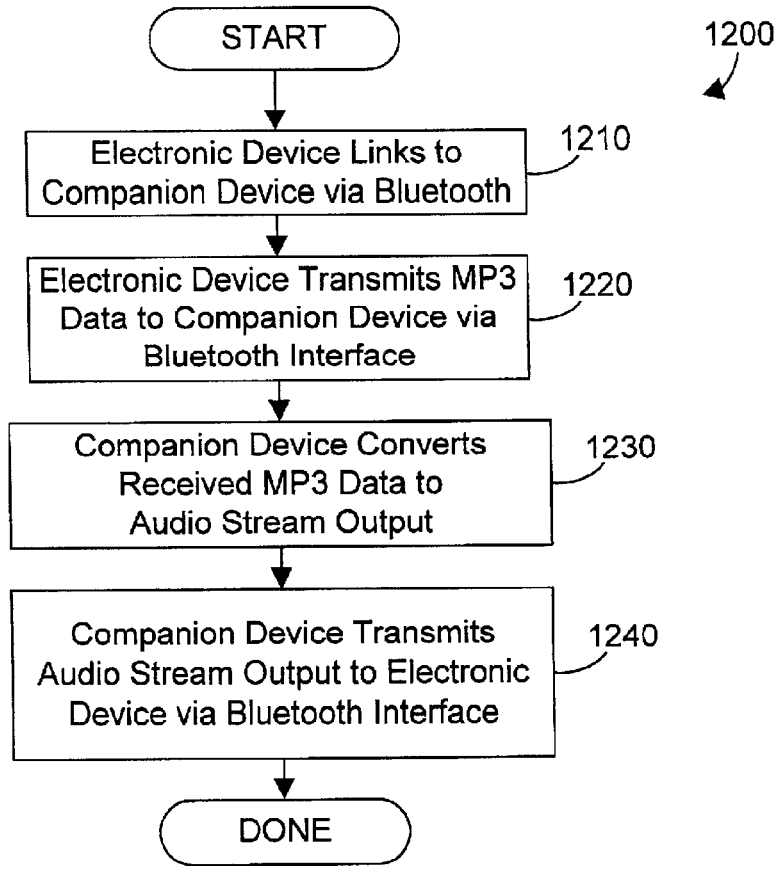
FIG. 12 is a flow diagram of a method for using the companion device in FIG. 11 in accordance with the first embodiment.

Method 1200 of FIG. 12 includes steps in accordance with the first embodiment for processing an MP3 audio file and generating therefrom a corresponding audio stream. First, the electronic device links to the companion device via Bluetooth (step 1210). Next, the electronic device transmits the MP3 data within the MP3 file to the companion device via the Bluetooth interface (step 1220). The companion device processes the MP3 data, and generates therefrom a corresponding audio stream output (step 1230), which is then transmitted to the electronic device via the Bluetooth interface (step 1240). In this manner the companion device 490C provides a the function of playing MP3 files that is not part of the native functions of the electronic device 410. This MP3 function would allow a user to download an MP3 file from any suitable source, and listen to the MP3 audio on speaker 454 of the electronic device 410 without providing the processing power or software for processing MP3 files within the electronic device 410 itself. In this manner a cell phone could be used to play MP3 files using companion device 490C.

Figure 13:
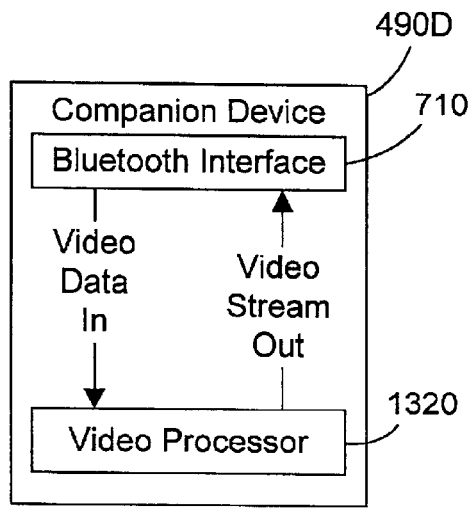
FIG. 13 is a block diagram of a companion device that processes video data and generates therefrom a corresponding video stream in accordance with the first embodiment.

Another specific example of a companion device within the scope of the first embodiment is companion device 490D shown in FIG. 13. Companion device 490D provides a video processor 1320 that processes video data and generates therefrom a video stream output. When the electronic device 410 links via its Bluetooth interface to companion device 490D, it can send digital video information (such as from a Digital Video Disc or from an MPEG file) to the companion device 490D via the Bluetooth interface 710. Video processor 1320 processes the received video data, and generates therefrom a corresponding video stream output, which is transmitted to the electronic device 410 via the Bluetooth interface 710. Note that current implementations of Bluetooth do not have the necessary bandwidth to transmit high-resolution video images, but future implementations will have higher bandwidth that will support video transmissions.

Figure 14:
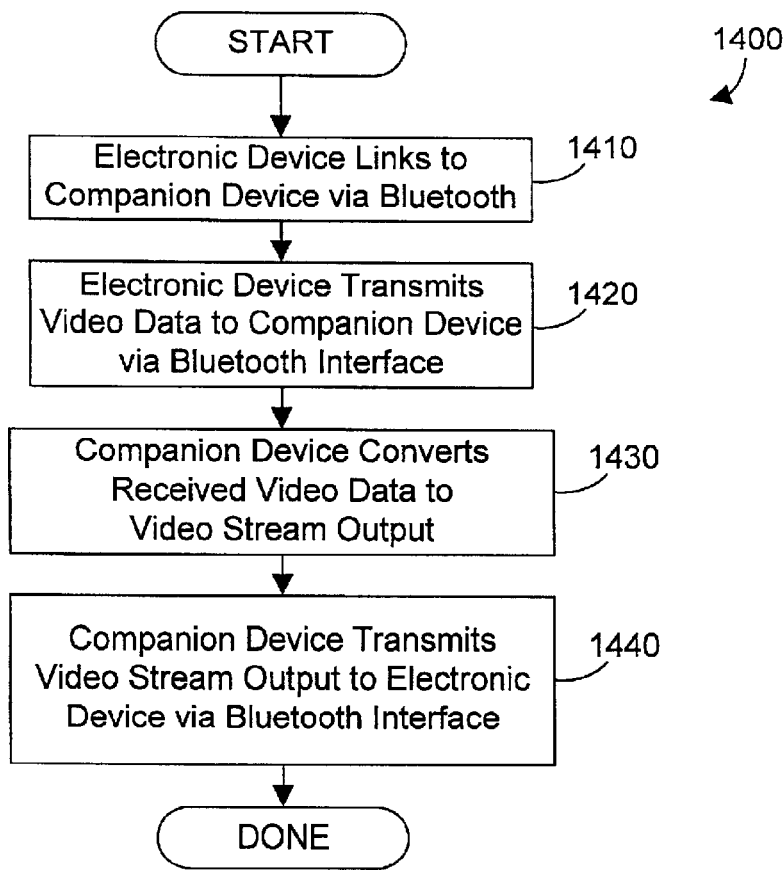
FIG. 14 is a flow diagram of a method for using the companion device in FIG. 13 in accordance with the first embodiment.

Method 1400 of FIG. 14 includes steps in accordance with the first embodiment for processing video data and generating therefrom a corresponding video stream output. First, the electronic device links to the companion device via Bluetooth (step 1410). Next, the electronic device transmits the video data to the companion device via the Bluetooth interface (step 1420). The companion device processes the video data, and generates therefrom a corresponding video stream output (step 1430), which is then transmitted to the electronic device via the Bluetooth interface (step 1440). In this manner the companion device 490D provides a the function of playing video files that is not part of the native functions of the electronic device 410. This video playing function would allow a user to download a video file from any suitable source, and view the video including sound on a display of electronic device 410 without providing the processing power or software for processing video files within the electronic device 410 itself. In this manner a cell phone or PDA could be used to play video files using companion device 490D, provided the device has a suitable display. In this mode the device could include an earphone jack so the user could hear the audio portion of the video while watching the video on the device display.

Figure 15:
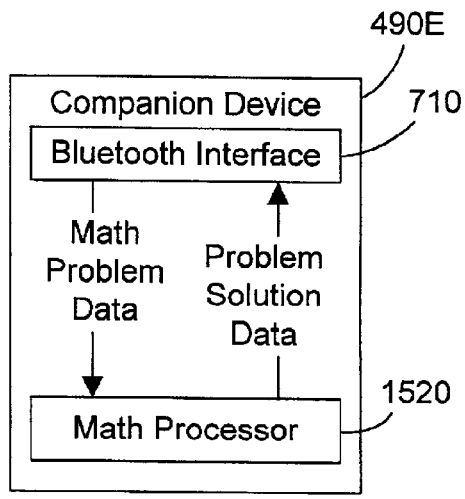
FIG. 15 is a block diagram of a companion device that performs math processing in accordance with the first embodiment.

Another specific example of a companion device within the scope of the first embodiment is companion device 490E shown in FIG. 15. Companion device 490E provides a math processor 1520 that can perform complex mathematical calculations, such as floating-point calculations, at a high rate of speed. When the electronic device 410 links via its Bluetooth interface to companion device 490E, it can send mathematical problem information to the companion device 490E via the Bluetooth interface 710. Math processor 1520 processes the received math problem data, and generates therefrom problem solution data, which is transmitted to the electronic device 410 via the Bluetooth interface 710.

Figure 16:
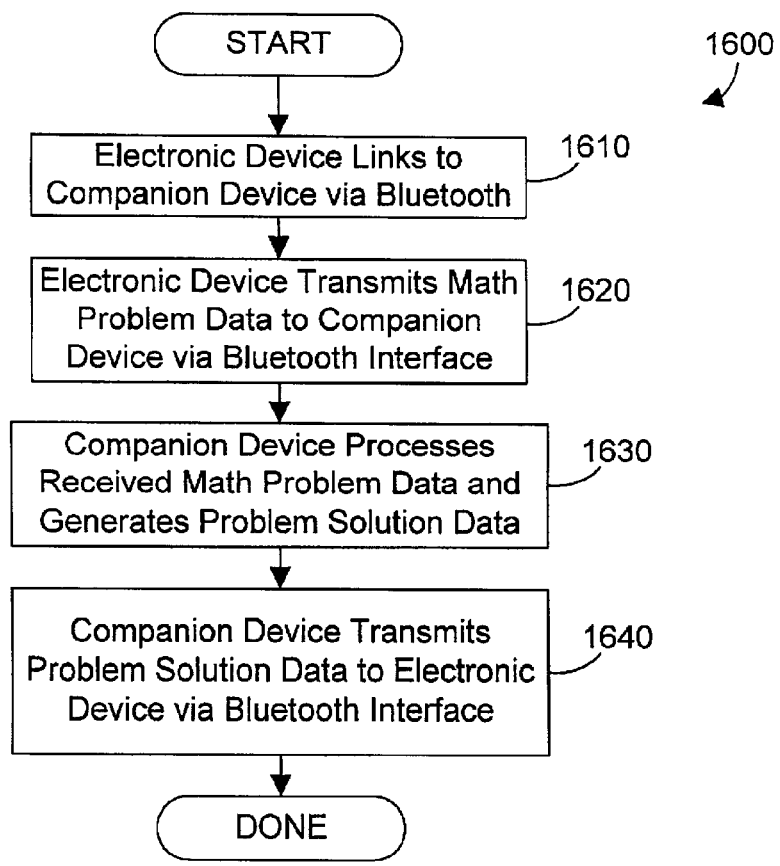
FIG. 16 is a flow diagram of a method for using the companion device in FIG. 15 in accordance with the first embodiment.

Method 1600 of FIG. 16 includes steps in accordance with the first embodiment for performing math calculations by the companion device 490E. First, the electronic device links to the companion device via Bluetooth (step 1610). Next, the electronic device transmits the math problem data to the companion device via the Bluetooth interface (step 1620). The companion device processes the math problem data, and generates therefrom problem solution data (step 1630), which is then transmitted to the electronic device via the Bluetooth interface (step 1640). In this manner the companion device 490E provides a math processor function that is not part of the native functions of the electronic device 410. This math processor function would also allow an electronic device 410 that has the native ability to perform complex calculations to greatly increase its performance by off-loading some of the complex calculations to the companion device 490E. If the electronic device 410 has very intense computational needs, multiple companion devices 490E could be coupled to the electronic device 410, with the electronic device 410 delegating different computations to different companion devices 490E to achieve some level of parallel processing.

Figure 17:
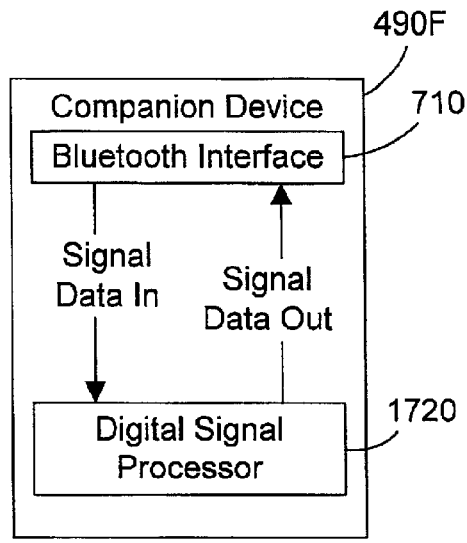
FIG. 17 is a block diagram of a companion device that provides digital signal processing in accordance with the first embodiment.

Another specific example of a companion device within the scope of the first embodiment is companion device 490F shown in FIG. 17. Companion device 490F provides a digital signal processor 1720 that can perform any suitable processing of an input signal. When the electronic device 410 links via its Bluetooth interface to companion device 490F, it can send signal data to the companion device 490F via the Bluetooth interface 710. Digital signal processor 1720 processes the received signal data, and generates therefrom corresponding signal data output, which is transmitted to the electronic device 410 via the Bluetooth interface 710.

Figure 18:
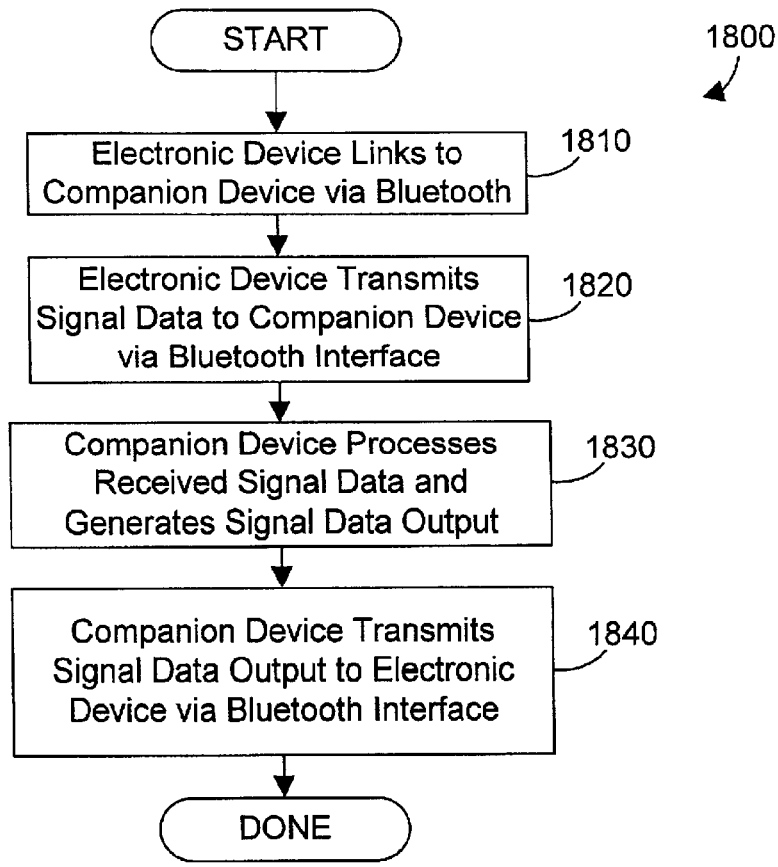
FIG. 18 is a flow diagram of a method for using the companion device in FIG. 17 in accordance with the first embodiment.

Method 1800 of FIG. 18 includes steps in accordance with the first embodiment for performing digital signal processing on a signal and returning the processed signal to the electronic device. First, the electronic device links to the companion device via Bluetooth (step 1810). Next, the electronic device transmits signal data to the companion device via the Bluetooth interface (step 1820). The companion device processes the signal data and generate signal data output (step 1830), which is then transmitted to the electronic device via the Bluetooth interface (step 1840). In this manner the companion device 490F provides a signal processing function that is not part of the native functions of the electronic device 410. Such a signal processing function would allow a user to process any suitable signal in any suitable manner. One specific example would be to provide an enhanced signal processor in a companion device that improves the clarity of the reception of a telephone signal received by a mobile phone.

Figure 19:
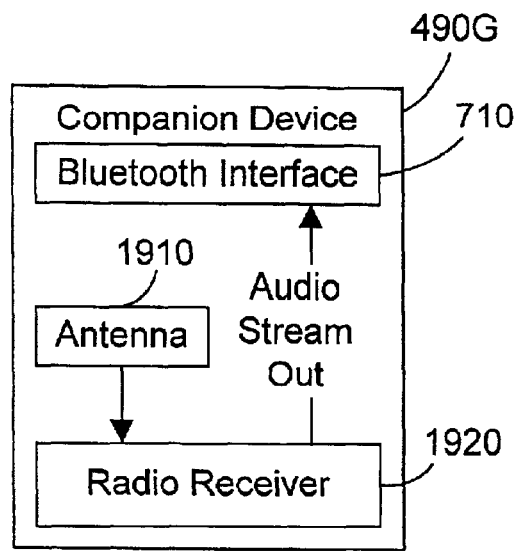
FIG. 19 is a block diagram of a companion device that receives a radio signal and provides an audio stream output in accordance with the second embodiment.
Figure 20:
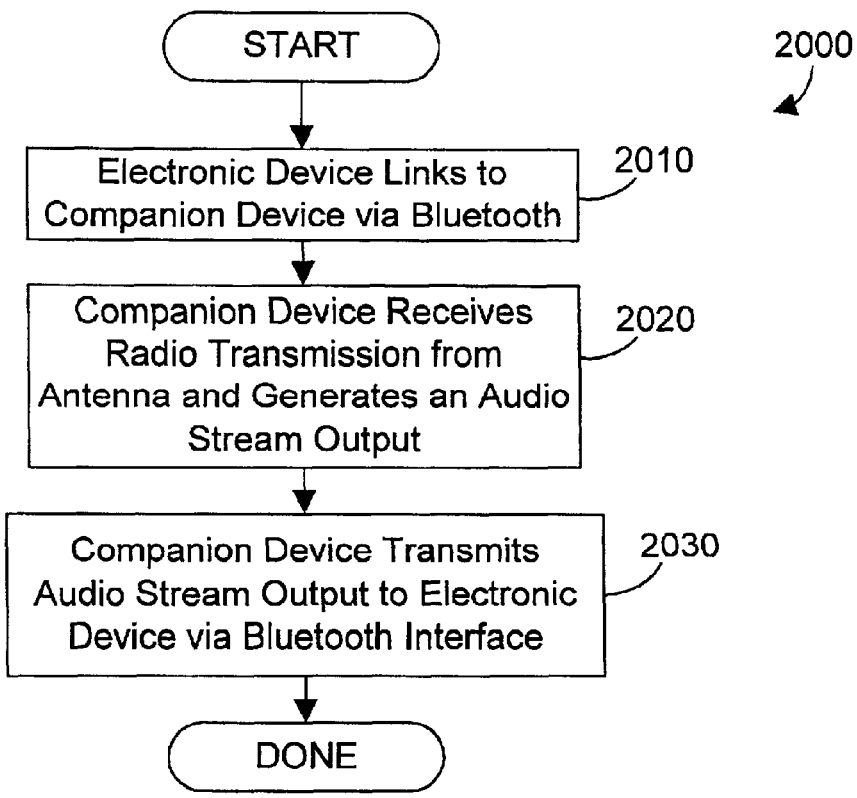
FIG. 20 is a flow diagram of a method for using the companion device in FIG. 19 in accordance with the second embodiment.

In a second embodiment of the invention, data is generated within the companion device 490 or is received by companion device 490 from some other source. This data is processed by companion device 490, and the processed data is then transmitted to the electronic device. An example of the second embodiment is shown in FIGS. 19 and 20. Companion device 490G provides a radio receiver 1920 that receives radio input from an antenna 1910, and that generates therefrom an audio stream output. When the electronic device 410 links via its Bluetooth interface to companion device 490G, it can receive an audio stream corresponding to a radio broadcast from the companion device 490G via the Bluetooth interface 710.

Method 2000 of FIG. 20 includes steps in accordance with the second embodiment for transmitting a radio audio signal to an electronic device. First, the electronic device links to the companion device via Bluetooth (step 2010). The companion device receives a radio transmission from the antenna and generates therefrom an audio stream output corresponding to the radio transmission (step 2020). The audio stream output is then transmitted to the electronic device 410 via the Bluetooth interface (step 2030). In this manner the companion device 490G provides a radio receiver function that is not part of the native functions of the electronic device 410. Such a radio receiver function would allow a user listen to a radio station using his mobile phone coupled to companion device 490G.

A slight modification to the companion device 490A of FIG. 7 results in a companion device that operates in accordance with the second embodiment. In the first embodiment described above, the text is received by the electronic device 410, is transmitted to the companion device 490A, which processes the text and sends the corresponding speech audio output to the electronic device 410 via Bluetooth interface 710. In the second embodiment, we assume that the companion device receives the text information from a source other than the electronic device 410. In other words, the companion device may receive text information via its Bluetooth interface from a computer system, or may receive text information from any other suitable source, including without limitation a hard-wire connection to another device and any suitable wireless connection to any suitable source of text data. This would allow a user to download e-mail messages, a novel, etc. from a desktop computer system into the companion device that can be listened to later on the user's mobile phone, rather than requiring that the text information be downloaded directly to the mobile phone itself.

Similar modifications could be made to the companion devices 490B of FIG. 9, 490C of FIG. 11, 490D of FIG. 13, 490E of FIG. 15, and 490F of FIG. 17 to allow each of these devices to receive input from a source other than electronic device 410. In this manner the preferred embodiments expressly extent to any type of data processing or transformation that may occur in a companion device.

Note that the companion device of the preferred embodiments cannot function without being coupled via its local wireless interface to an electronic device. In other words, alone the companion device does nothing. Only when it is linked to a compatible electronic device 410 can it perform its intended function. In addition, a small amount of programming will be required within the electronic device 410 to support the companion devices. However, this effort is minimal compared to the benefit of off-loading some of the processing to companion devices, and can be provided within the electronic device 410 at minimal cost.

The concepts presented herein provide a very powerful solution to the problem of wanting to add features to an electronic device. Instead of adding slots, ports, expansion cards, etc. to an electronic device, a companion device with a non-native function can perform the needed function whenever the companion device is within range of the local wireless interface. Due to the miniaturization of modern electronics, many companion devices could be no larger than a keychain remote that controls a car alarm or that remotely unlocks a vehicle. This would allow a business person to have many different functions available without building the functions into each device. A person could have many companion devices that are all stored within a briefcase. Let's assume that a business woman has in her briefcase a first companion device that provides text-to-speech conversion, a second that performs speech-to-text conversion, and a third that processes MP3 files and outputs an audio stream corresponding to the MP3 file. By placing these companion devices in her briefcase, the functionality of these companion devices would be available wherever her briefcase is located. Her desktop computer system at work could use any of these three companion devices rather than having these functions built into or added to the desktop computer system. These companion devices could be used by a mobile phone to answer a voice mail message with a text message, to listen to text e-mail messages, to provide voice messages in response to received text e-mail messages, and to listen to MP3 audio files. These three companion devices could also be used by the business woman's PDA. The MP3 companion device could be used by the woman's car stereo to play MP3 files while driving. The companion device of the preferred embodiments is a revolutionary concept that provides non-native function to any compatible electronic device.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A companion device that is used in conjunction with an electronic device, the companion device comprising:
    a local wireless interface that couples the companion device to the electronic device, wherein the companion device is a portable device; and
    a data processing mechanism coupled to the wireless interface that receives data in a first form from the electronic device via the wireless interface, that processes the data to a second form, and that outputs the processed data to the electronic device via the wireless interface, wherein the data processing mechanism only functions when a link between the companion device and the electronic device is established via the wireless interface when the companion device is in physical proximity to the electronic device.

2. The companion device of claim 1 wherein the electronic device includes a plurality of native functions, and wherein the data processing mechanism in the companion device provides at least one function that is not one of the plurality of native functions.

3. The companion device of claim 1 wherein the data processing mechanism comprises a speech processor that converts text information received from the electronic device via the wireless interface to speech audio information that is output to the electronic device via the wireless interface.

4. The companion device of claim 1 wherein the data processing mechanism comprises a speech recognition processor that processes speech audio information received from the electronic device via the wireless interface and generates therefrom corresponding text information that is output to the electronic device via the wireless interface.

5. The companion device of claim 1 wherein the data processing mechanism comprises an audio processor that processes digital audio information received from the electronic device via the wireless interface and generates therefrom a corresponding audio output to the electronic device via the wireless interface.

6. The companion device of claim 1 wherein the data processing mechanism comprises a video processor that processes digital video information received from the electronic device via the wireless interface and generates therefrom a corresponding video output to the electronic device via the wireless interface.

7. The companion device of claim 1 wherein the data processing mechanism comprises a math processor that processes at least one mathematical problem received from the electronic device via the wireless interface and that generates at least one solution to the at least one mathematical problem, wherein the at least one solution is output to the electronic device via the wireless interface.

8. The companion device of claim 1 wherein the data processing mechanism comprises a digital signal processor that processes a signal received from the electronic device via the wireless interface, wherein the processed signal is output to the electronic device via the wireless interface.

9. The companion device of claim 1 wherein the electronic device includes a wireless telephone interface.

10. The companion device of claim 1 wherein the companion device functions only when coupled to the electronic device.

11. A companion device that is used in conjunction with an electronic device, the companion device comprising:
a local wireless interface that couples the companion device to the electronic device and that transfers first data from the electronic device to the companion device and transfers second data from the companion device to the electronic device, wherein the companion device is a portable device, and the wireless interface including a mechanism that automatically establishes a link between the companion device and the electronic device when the companion device and the electronic device are in physical proximity to each other that allows the electronic device and the companion device to communicate via the wireless interface;
an identification mechanism that identifies a data processing function of the companion device to the electronic device when the link is automatically established between the companion device and the electronic device, wherein the electronic device includes a plurality of native functions, and wherein the data processing function comprises at least one function that is not one of the plurality of native functions; and
a data processing mechanism coupled to the wireless interface that receives the first data from the electronic device via the wireless interface, that performs the data processing function by processing the first data and generating therefrom the second data, and that outputs the second data to the electronic device via the wireless interface, wherein the data processing mechanism only performs the data processing function when the link between the companion device and the electronic device is established via the wireless interface when the companion device and the electronic device are in physical proximity to each other.

12. The companion device of claim 11 wherein the electronic device includes a wireless telephone interface.

13. The companion device of claim 11 wherein the companion device functions only when coupled to the electronic device.

14. An electronic system comprising:
(A) an electronic device comprising:
a first local wireless interface comprising a receiver and a transmitter;
(B) a portable companion device comprising:
a second local wireless interface compatible with the first local wireless interface, the second local wireless interface comprising a receiver that may receive data from the transmitter in the first local wireless interface, and a transmitter that may transmit data to the receiver in the first local wireless interface; and
a data processing mechanism coupled to the second local wireless interface that receives data in a first form from the electronic device via the wireless interface, that processes the data to a second form, and that outputs the processed data via the second local wireless interface to the first wireless interface in the electronic device, wherein the data processing mechanism only functions when a link between the companion device and the electronic device is established via the first and second wireless interfaces when the companion device is in physical proximity to the electronic device.

15. The electronic system of claim 14 wherein the second local wireless interface further comprises an identification mechanism that defines the function of the data processing mechanism to the electronic device.

16. The electronic system of claim 14 wherein the electronic device includes a plurality of native functions, and wherein the data processing mechanism in the companion device provides at least one function that is not one of the plurality of native functions.

17. The electronic system of claim 14 wherein the data processing mechanism comprises a speech processor that converts text information received from the electronic device via the wireless interface to speech audio information that is output to the electronic device via the wireless interface.

18. The electronic system of claim 14 wherein the data processing mechanism comprises a speech recognition processor that processes speech audio information received from the electronic device via the wireless interface and generates therefrom corresponding text information that is output to the electronic device via the wireless interface.

19. The electronic system of claim 14 wherein the data processing mechanism comprises an audio processor that processes digital audio information received from the electronic device via the wireless interface and generates therefrom a corresponding audio output to the electronic device via the wireless interface.

20. The electronic system of claim 14 wherein the data processing mechanism comprises a video processor that processes digital video information received from the electronic device via the wireless interface and generates therefrom a corresponding video output to the electronic device via the wireless interface.

21. The electronic system of claim 14 wherein the data processing mechanism comprises a math processor that processes at least one mathematical problem received from the electronic device via the wireless interface and that generates at least one solution to the at least one mathematical problem, wherein the at least one solution is output to the electronic device via the wireless interface.

22. The electronic system of claim 14 wherein the data processing mechanism comprises a digital signal processor that processes a signal received from the electronic device via the wireless interface, wherein the processed signal is output to the electronic device via the wireless interface.

23. The electronic system of claim 14 wherein the electronic device includes a wireless telephone interface.

24. The electronic system of claim 14 wherein the companion device functions only when coupled to the electronic device.

25. An electronic system comprising:
(A) an electronic device comprising:
   a first local wireless interface comprising a receiver and a transmitter; and
   a plurality of native functions;
(B) a portable companion device comprising:
   a second local wireless interface compatible with the first local wireless interface, the second local wireless interface comprising a receiver that may receive data from the transmitter in the first local wireless interface, and a transmitter that may transmit data to the receiver in the first local wireless interface, the first and second local wireless interfaces each including at least one mechanism that automatically establishes a link between the companion device and the electronic device when the companion device and the electronic device are in physical proximity to each other, the at least one mechanism allowing the electronic device and the companion device to communicate via the first and second local wireless interfaces;
   an identification mechanism that identifies a data processing function of the companion device to the electronic device when the link is automatically established between the companion device and the electronic device, wherein the data processing function comprises at least one function that is not one of the plurality of native functions in the electronic device; and
   a data processing mechanism coupled to the second local wireless interface that performs the data processing function by processing first data received from the electronic device via the first and second Local wireless interfaces and generating therefrom second data, and that outputs the second data to the electronic device via the second and first wireless interfaces, wherein the data processing mechanism only performs the data processing function when the link between the companion device and the electronic device is established when the companion device and the electronic device are in physical proximity to each other.

26. A method for providing non-native function to an electronic device that includes a first wireless interface, the method comprising the steps of:
(A) providing a portable companion device that comprises a second wireless interface that may communicate with the first wireless interface in the electronic device;
(B) activating the companion device due to physical proximity of the companion device to the electronic device;
(C) the electronic device outputting data in a first form to the first wireless interface;
(D) the first wireless interface transmitting the data to the second wireless interface in the companion device;
(E) the companion device receiving the data;
(F) the companion device processing the data to a second form;
(G) the companion device outputting the processed data to the second wireless interface; and
(H) the second wireless interface transmitting the processed data to the first wireless interface in the electronic device.

27. The method of claim 26 further comprising the step of establishing a link between the first wireless interface and the second wireless interface.

28. The method of claim 26 wherein the electronic device includes a plurality of native functions, and wherein the companion device provides at least one function that is not one of the plurality of native functions.

29. The method of claim 26 wherein the data comprises text information received from the electronic device via the wireless interface, and wherein the companion device converts the text information to speech audio information, the processed data comprising the speech audio information.

30. The method of claim 26 wherein the data comprises speech audio information received from the electronic device via the wireless interface, and wherein the companion device generates from the speech audio information corresponding text information, the processed data comprising the text information.

31. The method of claim 26 wherein the data comprises digital audio information received from the electronic device via the wireless interface, and wherein the companion device generates from the digital audio information a corresponding audio output, the processed data comprising the audio output.

32. The method of claim 26 wherein the data comprises digital video information received from the electronic device via the wireless interface, and wherein the companion device generates from the digital video information a corresponding video output, the processed data comprising the video output.

33. The method of claim 26 wherein the data comprises at least one mathematical problem received from the electronic device via the wireless interface, and wherein the companion device processes the at least one mathematical problem and generates at least one solution to the at least one mathematical problem, the processed data comprising the at least one solution.

34. The method of claim 26 wherein the data comprises a signal received from the electronic device via the wireless interface, and wherein the companion device digitally processes the signal, the processed data comprising the digitally processed signal.

35. The method of claim 26 wherein the electronic device includes a wireless telephone interface.

36. The method of claim 26 wherein the companion device functions only when coupled to the electronic device.

37. A method for providing non-native function to an electronic device that includes a first local wireless interface, the method comprising the steps of:
(A) providing a portable companion device that comprises a second local wireless interface that may communicate with the first local wireless interface in the electronic device;
(B) automatically establishing a link between the first local wireless interface in the electronic device and the second local wireless interface in the companion device when the companion device and the electronic device are in physical proximity to each other, the link allowing the electronic device and the companion device to communicate via the first and second local wireless interfaces, wherein the companion device only functions when the link is established;

(C) the companion device identifying to the electronic device via the second and first local wireless interfaces a data processing function of the companion device, wherein the data processing function comprises the non-native function;

(D) the companion device receiving first data from the electronic device via the first and second local wireless interfaces;

(E) the companion device processing the first data according to the data processing function to generate second data; and (F) the companion device outputting the second data to electronic device via the second and first local wireless interfaces.

38. The method of claim 37 wherein the electronic device includes a wireless telephone interface.

* * * * *